United States Patent
Sun et al.

(10) Patent No.: US 9,137,026 B1
(45) Date of Patent: Sep. 15, 2015

(54) SEAMLESS SERVICE TRANSITIONS FOR DUAL-NETWORK MOBILE DEVICES

(75) Inventors: Yaojun Sun, South Riding, VA (US); Lezhang Chen, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1077 days.

(21) Appl. No.: 12/429,001

(22) Filed: Apr. 23, 2009

(51) Int. Cl.
| | |
|---|---|
| *H04W 4/00* | (2009.01) |
| *H04L 12/16* | (2006.01) |
| *H04L 12/54* | (2013.01) |
| *G06F 15/16* | (2006.01) |
| *H04W 36/00* | (2009.01) |

(52) U.S. Cl.
CPC ............... *H04L 12/16* (2013.01); *H04L 12/56* (2013.01); *G06F 15/16* (2013.01); *H04W 36/00* (2013.01)

(58) Field of Classification Search
USPC .......................................................... 370/331
See application file for complete search history.

(56) References Cited

U.S. PATENT DOCUMENTS

| | | | |
|---|---|---|---|
| 7,386,316 B2 | 6/2008 | Shieh | |
| 2004/0071088 A1* | 4/2004 | Curcio et al. | 370/235 |
| 2004/0125757 A1* | 7/2004 | Mela et al. | 370/261 |
| 2004/0233866 A1* | 11/2004 | Bossoli et al. | 370/328 |
| 2007/0218902 A1* | 9/2007 | Smyk et al. | 455/436 |
| 2009/0109921 A1* | 4/2009 | Bowen | 370/331 |
| 2009/0177785 A1* | 7/2009 | Reid et al. | 709/228 |
| 2009/0279503 A1* | 11/2009 | Chin et al. | 370/331 |
| 2012/0020325 A1* | 1/2012 | Swamy et al. | 370/331 |

OTHER PUBLICATIONS

'N' Group, "White Paper on Dual Mode Phone (GSM & Wi-Fi)", http://canarie.co.in/dualmodephone.pdf.
"Azaire Networks and Dopod Demonstrate Dual Network Services: Demonstration Powered by Azaire's AdvancedTCA-based IP-CNP and Dopod 900 3G Mini Sub-Note", Azaire Networks, http://www.azairenet.com/pr_dopod.html, Feb. 14, 2006.

* cited by examiner

Primary Examiner — Kodzovi Acolatse

(57) ABSTRACT

Methods, media, and systems are provided for switching delivery of streaming services to dual-network mobile devices. Instances of streaming content can be first delivered by a network of a first protocol to the mobile device, then delivered by a network that uses a second protocol. This transition takes place seamlessly as the handoff changes the Internet Protocol (IP) address of the receiving device through a connection session controller (CSC) server and a switching helper application (SHA) on the mobile device. A session identifier ensures the appropriate streaming instance is paused, resumed, and redirected. The dual-network wireless device is configured to include an SHA configured to initiate and complete a switch of service in conjunction with the CSC.

14 Claims, 5 Drawing Sheets

SEAMLESS SERVICE TRANSITIONS FOR DUAL-NETWORK MOBILE DEVICES

SUMMARY

The present invention is defined by the claims below, but in brief, our technology provides for methods, media, and systems for switching delivery of streaming services to dual-network mobile devices. An instance of streaming content can be first delivered by a network of a first protocol to the mobile device, then delivered by a network that uses a second protocol. This transition can take place with a seamless handoff so that the user of the mobile device can continue to watch and/or listen to the content without interruption. Unlike a handoff between similar networks, such as a situation of cellular coverage changing from roaming to a home network or vice versa, the Internet Protocol (IP) address of the receiving device must be changed in a two-protocol handoff. This creates an additional layer of complexity handled by a connection session controller (CSC) server and a switching helper application (SHA) on the mobile device.

In a first aspect, a computer-implemented method is provided that seamlessly transitions between telecommunications networks that provide a streaming service to a mobile device. The mobile device is able to access the streaming service on two telecommunications networks that utilize incompatible protocols. The streaming service is initially received at a first address. The method includes, via a first telecommunications network, communicating a switch request from the mobile device to a connection session controller (CSC) to initiate a change in telecommunications networks for the streaming service. Delivery of the streaming service through the first telecommunications network is changed to delivery of the streaming service through a second telecommunications network. An acknowledgement of the switch request is communicated from the CSC to the mobile device. Via the second telecommunications network, a completion request is communicated from the wireless device to the CSC. The streaming service is then received at the wireless device via the second telecommunications network.

In a second aspect, one or more computer-storage media having computer-usable instructions for performing a method of facilitating seamless transitions for instances of streaming service to dual-network mobile devices. Instances of streaming service are provided by a first and a second telecommunications network that are utilizing incompatible protocols. The method is performed at a connection session controller (CSC). The method includes, via a first telecommunications network streaming an instance of streaming service to a mobile device at a first address, receiving a first request. The request is to change streaming service through the first telecommunications network subsequently to be streamed through the second telecommunications network. The instance of streaming service is received at a first address. A first acknowledgement is communicated to the mobile device acknowledging the first request. A second request is communicated to a server streaming the instance of streaming service to pause the streaming service. A second acknowledgement is received to the second request. Via the second telecommunications network, a third request to complete the change of streaming service from the first telecommunications network to the second telecommunications network is received from the wireless device. A fourth request is communicated to the server streaming the instance of streaming service to resume the streaming service. The instance of streaming service is redirected to the wireless device via the second telecommunications network.

In a third aspect, a system is provided that is configured to perform a method of enabling a dual-network device to seamlessly transition between two telecommunications networks providing service to the dual-network device. The system includes a dual-network wireless device configured to receive streaming media from at least two telecommunications networks. The at least two telecommunications networks utilize incompatible protocols in order to provide streaming media to the device. The system also includes one or more switching helper applications configured to initiate and complete a switch of service from a first telecommunications network to a second telecommunications during execution of an instance of streaming media.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
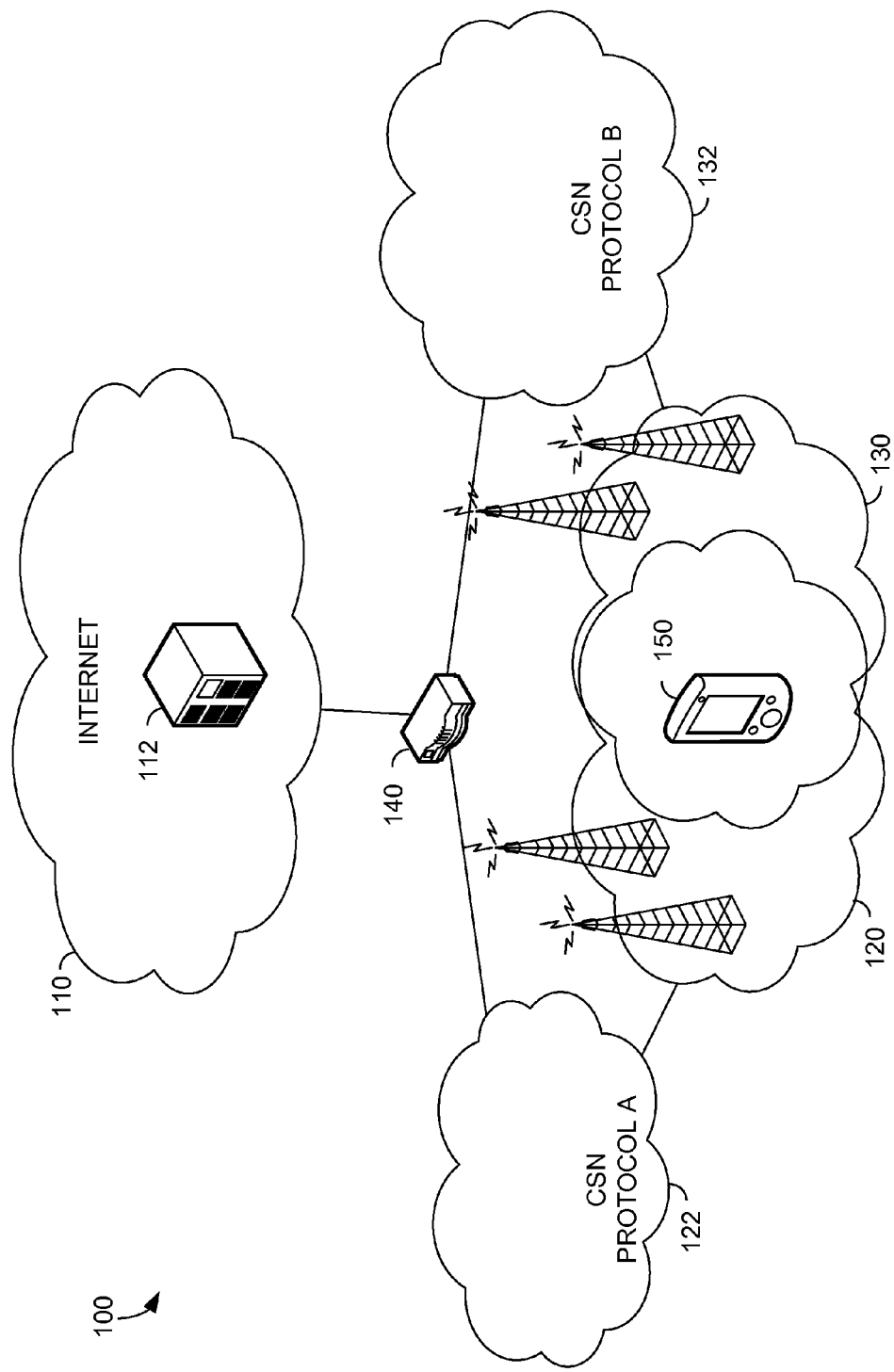
FIG. 1 is an exemplary environment in which dual-network mobile devices can seamlessly switch delivery networks while streaming an instant of media content.

The present description provides systems, media, and methods for switching the network from which dual-network devices receives streaming instances of media content, and does so seamlessly. Different providers, technologies, and access methods mean that there are a myriad of networks, from the as-available Wi-Fi internet access, to the subscriber-based cellular phone and mobile broadband networks of telecommunications providers. One characteristic of these different networks is the addressing method used to assign a device a location on the network. A provider can provider a separate, distinct address for every single device on the network. However, in many mobile contexts, not every device is on the network at the same time. Rather than establish a fixed address for every device, often times Internet protocol (IP) addresses are pooled and assigned on an as-needed basis. In this way, if no more than a 1,000 users get on a network at any given time, a network of 50,000 subscribers can share 1,000 addresses without affecting service quality.

Streaming media content, such as voice over IP traffic, movies, music, radio programming, and television programming, can be sent over various types of networks. These audio, video, and audio-video files can be streamed according to a number of different protocols, both from an actual application standpoint, and from the perspective of the delivering access network. For example, one common streaming protocol is Real-time Transport Protocol (RTP), which has the ability to deliver end-to-end data files. RTP is associated with Real-time Transport Control Protocol (RTCP), which monitors service and synchronization in conjunction with the RTP-delivered data. Both RTP and RTCP are built over the User Datagram Protocol (UDP), which is an underlying protocol developed for timely delivery of packets when losses may be tolerated. Real-Time Session Protocol (RTSP) is also associated with these protocols and allows for issuing commands, for instance to start and stop streaming.

Also a streaming protocol, Voice over IP (VoIP) enables telephone connections to be made. Each end of the conversation is streaming audio content that is sent to the receiver through an application server, rather than through a direct circuit connection. In yet another example, protocols that rely on Transmission Control Protocol (TCP) can also be used for streaming media content. These protocols are used less frequently, because of emphasis of TCP on reliability rather than timeliness. Regardless of the protocol used, an application server or streaming server can use a number of different protocols to provide content to requesting users via the internet.

Dual-network devices, as will be used throughout this disclosure, are those that can access services via networks of two differing access protocols. For example, a dual-network device can have the capability to access a code division multiple access (CDMA) cellular network, as well as a wireless microwave access network. These could be standards-based protocols, such as the CDMA2000™ and the Worldwide Inter-operability for Microwave Access (WiMAX™) standards. CDMA2000 is a voluntary industry standard that was developed by the Telecommunications Industry Association, headquartered in Arlington, Va. WiMAX is a standard based on scalable orthogonal frequency division multiple access (SOFDMA) technology and is set forth in the Institute of Electrical and Electronic Engineers (IEEE) 802.16 broadband wireless access standard. The WiMAX Forum at Beaverton, Oreg. oversees the WiMAX standard and promotes its use.

This is contrasted with the application server responsible for sending streaming media content. The application server does not use two varying protocols, but dual-network refers to the access network and device. This dual-network feature is also to be contrasted with roaming, which simply involves the use of a same underlying protocol on a different provider network. Dual-network devices are able to access two (or more) completely separate technologies that operate on different networks. However, the same telecommunications provider can provide both networks. Simply put, mobile devices with only one access technology would not be able to connect to the second (or greater number) of networks because of the incompatibility in access protocols.

The use of a proxy server between the two networks, used for those connections made by dual-network devices, allows for the mobile device to establish an "interchangeable" session. By placing this intermediary server in between the streaming server and the device, switching helper applications (SHAs) can pass requests to the proxy. The proxy server, labeled a connection session controller (CSC) for the purposes of this disclosure, can manage state data and send requests to the streaming server as necessary. The change from a first network to a second network by the device results in the CSC providing a second IP address at which the media content will be delivered. This allows for a pause and switch period to take place for the device. The CSC resumes streaming the content, but redirects it to the device via the second network. Because the streaming content is sent through the CSC server, the stream can momentarily be stored and then redirected as needed, but so as to not interrupt the user's consumption of the content.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ASN Access Service Network
BS Base Station
BSC Base Station Controller
CSC Connection Session Controller
CSN Connectivity Services Network
GSM Global Syssytem for Mobile communications
IP Internet Protocol
RTCP Real-time Transport Control Protocol
RTP Real-time Transport Protocol
RTSP Real-time Session Protocol
SHA Switching Helper Application
SOFDMA Scalable Orthogonal Frequency Division Multiple Access
TCP Transmission Control Protocol
UDP User Datagram Protocol
WiMAX ™ Wireless Microwave Access Further, various technical terms are used throughout this description. An illustrative resource that fleshes out various aspects of these terms can be found in *Newton's Telecom Dictionary* by H. Newton, $24^{th}$ Edition (2008).

In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned above, dual-network devices have the ability to access the internet through more than one underlying technology. For the purposes of this disclosure, the dual-network device described will employ both CDMA cellular telephone and WiMAX wireless broadband technologies. This is not to limit embodiments of the present invention only to these two protocols. Rather, it is but one example of a combination of dissimilar protocols that one device can use to access services. The multiple networks could rely on both Global System for Mobile (GSM) communications protocol (which rely on time division multiple access (TDMA) and frequency division multiple access (FDMA) technologies) and WiMAX. Other combinations of protocols for access are possible and contemplated within the scope of the present invention.

In a typical telecommunication network, two segments of the network are delineated as having separate functions and operations. The access services network (ASN) is the portion of the network that grants devices access to the telecommunications network as a whole. In the case of cellular telephony, this can be include cellular towers, base transceiver stations (BTSs), and the necessary routing elements needed to send signals from the access network to the network core. The point at which the ASN connects to the core network defies distinct boundaries, as the access network and core network do share some common elements. Therefore, the ASN cannot be entirely distinguished from the core network. But, many of its components can be thought of as only residing in the access network portion.

The core network can also be referred to as a connectivity services network (CSN) and employs different and similar types of elements. These can include routers, switches, repeaters, and a variety of servers. The servers on the CSN can include authentication and authorization servers, billing servers, operations servers, and organization and administration (OAM) servers, to name a few that handle backend functions. While the equipment on the CSN also allows devices access to interact with other networks, such as connecting ordinary phones calls with and sending text messages to devices on other networks, the core network has a primary function of tying different networks together. This can be the connection of access networks on the overall network of the telecommunications provider, or the connection of the provider's network to other networks. This includes the internet.

The CSN provides the ability for devices to send requests and receive responses from elements such as application servers and streaming servers that are web-accessible. Absent the present invention, multimedia content that is available through web access is served by a web server sending information via the internet to the CSN and ultimately to the ASN. As mentioned above, this will be according to an application protocol, such as RTP or VoIP, on a network with an underlying protocol, such as CDMA or WiMAX. Dual-network devices, then, can use either a CDMA or a WiMAX network in order to browse and receive content on the web through a CSN that supports the underlying protocol the device is using at that instant, i.e., either a CDMA CSN or a WiMAX CSN.

Utilizing methods, media, and systems described below, telecommunications providers can enable dual-network devices to transition with seamless handoffs between disparate networks through the use of a proxy server. That proxy, called a connection session controller (CSC), resides at a point between the internet and both delivery networks. The CSC is a server that can handle the requests and responses necessary to process these handoffs and ensure that the instances of streaming media content are delivered without interruption to the mobile device. The passing back and forth of identifiers, issuance of control instructions, and the redirection of the stream are possible using the CSC. Each will be described in further detail below.

One aspect of the connection session controller is its ability to generate a session identifier with respect to the instance of streaming media content and the server from which that content is being streamed. If a request is made to switch the delivery network through which the instance of media content is being streamed, the CSC generates a session identifier. The session identifier should be descriptive enough to uniquely identify the instance of media content, the server from which the instance is being streamed, and the mobile device to which the content is to be communicated. There are a number of ways to do this, such as through the use of an identifier and table of values.

For example, if content X is being streamed from server A to device 1, there could be an identifier from the content, an IP address of server A, and a pooled IP address of device 1 all stored in association with a first session identifier. Likewise, content Y from server B to device 2 could be stored in association with a second identifier, and so forth. Each of these bits of information would be available from the streaming content as soon as the streaming session has begun, as the packet headers would include a destination IP address (i.e., the pooled address of the mobile device), a source address (the streaming server), and other information denoting the instance being streamed.

The CSC can associate this information with the session identifiers so that the instance of streaming content can be momentarily paused. Access by the mobile device on a second delivery network results in a new pooled IP address for the device and, with it, creates a new destination for the instance of streaming media content. A seamless transition to a new IP address means redirecting the stream to the new location, rather than tearing down the entire stream and setting it up for a new destination. Therefore, the CSC can temporarily pause the stream of packets for the instance of media content at this intermediary point, between the internet and the CSN, in order to redirect the remaining packets to the second IP address.

The pausing and resuming of the instance of media content at the CSC can happen quickly enough that a user consuming the content will not notice the transition. This is part of what allows for the seamless handoff. Additionally, any redirection subsequent to the pause-and-resume point, through the changing of packet header destination addresses, can also happen in near real-time fashion. Because the instance of streaming media content was already taking place through the CSC from the beginning, the route from the streaming server to the CSC does not change. As a result, only the traversal from the CSC to the device through the second network changes the overall routing of the packets (i.e., affecting latency, jitter, etc.).

As mentioned above, in order for this to take place, at least one switching helper application (SHA) resides on the dual-network mobile device. The SHA sends a request to the CSC to initiate the change in access networks. This can be in response to a weakening signal to gain access from the first access network. Alternatively, it can be in response to device movement from an area where an access network is not available to one where it is (i.e., if WiMAX should be used when available, but is not available with the instance of streaming media content begins). By sending the request to switch networks, the SHA signals to the CSC to send the necessary information to the streaming server to carry out the procedures above and below.

In the figures and succeeding descriptions, like numbering will be used where possible. In describing FIG. 1, an exemplary environment 100 is shown in which a dual-network mobile device's access network can be switched with a seamless transition. A dual-network mobile device 150 is depicted within the vicinity of two access services networks, an ASN 120 and an ASN 130. ASN 120 is shown with the description that it operates according to a protocol A, while ASN 130 is shown operating according to a protocol B. These are not intended to convey particular protocols, but are show to demonstrate that the protocols used by each ASN are in fact different. Only by way of example, protocol A could be one of the protocols in accordance with CDMA, such as CDMA2000. Also as an example, protocol B could be completely different type of access technology, such as WiMAX.

Access services network 120 is logically coupled with a connectivity services network (CSN) 122. CSN 122 provides the core network services needed by ASN 120, as well as any other access network that it is responsible for connecting. Likewise, ASN 130 is coupled with a CSN 132, which provides the core network services for that access network and any other applicable ASNs. The inclusion of CSN 122 and CSN 132 are intended to convey that these are entirely separate connectivity services networks, again operating with dissimilar basic technologies. Without dual-network device, a mobile device would, at best, operate on only one of the networks shown and not both.

Continuing with FIG. 1, each of the connectivity services networks are coupled to a connection session controller 140. There is a solid line connecting CSC 140 with the two CSNs. However, this should not be construed to imply a limitation that CSC 140 be directly coupled or connected to either connectivity service network. It should be understood that a number of elements may be needed to connect CSC 140 with CSN 122 and CSN 132, such as routers, switches, repeaters, etc. This is not to say that CSC 140 is restricted from direct connection, just that it is not necessary for the purposes describing the environment. Likewise, ASN 120 and CSN 122 may be directly or indirectly coupled, as can ASN 130 and CSN 132.

FIG. 1 shows an internet 110 to represent the internet, and an application server 112 contained within the network of internet 110. Application server 112 can be any type of application server delivering streaming content to the web, such as a server that streams movies or recorded audio, visual, or audio-visual content. Server 112 can deliver real-time streaming content, such as television or radio broadcasting. Application server 112 need not deliver a mass-media payload, but can just as easily provide telephony services through VoIP service. Internet 110 is logically coupled with CSC 140 to denote that web services reach dual-network mobile device 150 on one of the two access networks by way of CSC 140.

With reference to FIG. 1, the delivery ASN used to first stream an instance of media content to device 150 is not relevant. Either ASN 120 or ASN 130 can be utilized by mobile device 150 to reach web content streamed by application server 112. Device 150 can send a request to switch access networks. CSC 140 sends to server 112 a request to pause the stream. Once device 150 is available on the second network (either 120 or 130), device 150 sends a completion request. CSC 140 sends a resume request to the application server and redirects the stream to mobile device 150 at the new IP address located on the second network.

Utilizing the environment described above or one substantially similar to it, a flow of information can take place regarding the requests, responses, identifiers, addresses and content passed between the application server and the mobile device by way of the CSC. A request to switch networks communicated from the mobile device to the CSC alerts the CSC that the instance should be delivered to a different IP address. The CSC communicates the session ID to the mobile device and a request to the application server to pause the instance of streaming content, although they can be sent in either order or simultaneously. The application server sends a response to the CSC acknowledging the pause request.

Once the wireless device has gained access on the second network, (i.e., has been assigned a new IP address), the wireless device can send a request to the CSC to complete the seamless switch. The CSC requests resumption of service by the application server, which can respond with an acknowledgement and resume streaming the instance of media content. That instance is streamed from the application server to the CSC, which redirects the instance to the device on the second network.

Description will now be given of FIG. 2, which is a diagram depicting the flow of information in a seamless transition according to the above descriptions. An instance of streaming media, shown as an instance 204, is sent at a step 202. As described previously, this can be an instance of recorded or real-time content, such as a movie, television programming, radio programming, recorded music, or a voice conversation. The instance is streamed from a streaming server 212 to a wireless device in a network 220, denoted as network A. The instance is streamed by way of a connection session controller 240.

At a step 250, a request to switch networks 252 is sent from wireless device 220 to CSC 240. Request 252 can be generated by a switching helper application and include all information deemed pertinent by the SHA. At a step 254, CSC 240 sends a session identifier 256 indicative of the streaming server, instance, and destination of the current instance of streaming content.

A request to pause 260 is sent from CSC 240 to streaming server 212 at a step 258. This need not be subsequent to the communication of session ID 256 at step 254, nor does it need to proceed step 254. Both can occur simultaneously. Request to pause 260 could be communicated with a structured command, such as one sent using Real-Time Session Protocol (RTSP) as described above. At a step 262, a response 264 is sent back from server 212 to connection session controller 240, which can be an RTSP acknowledgement.

At a step 266, a completion request 268 is sent from the wireless device in network B and denoted as wireless device 230. It is important to note that, even though numbered differently, this is the same dual-network mobile device. Device 230 is merely on a different delivery network and operating with a different protocol. For example, wireless device 220 can represent a device on a CDMA network, while wireless device 230 is the same device on a WiMAX-compliant network. The completion request can include at least the session ID so as to correctly identify instance of content 204 that should be redirected to mobile device 230.

A request 272 to resume is sent from CSC 240 to streaming server 212. Again this can be communicated with a structured command, such as is available through RTSP or similar stream-controlling protocol. Application server 212 sends a response 276 at a step 274 that acknowledges request to resume 272. Instance of streaming media content 204 is once again served from streaming server 212 to controller 240 at a step 278.

At a step 280, an instance of streaming content 206 is streamed to wireless device 230 in network B via connection session controller 240. This is substantially the same instance as was streamed before. However, instance 206 is now addressed with a different destination IP address in the packet headers, to redirect the stream appropriately. This difference in packet headers is the reason the instance is numbered differently in the figure. Because of the different pool of IP addresses in the second network, the only difference in the packets streamed to device 230 are their destination IP address.

Figure 2:
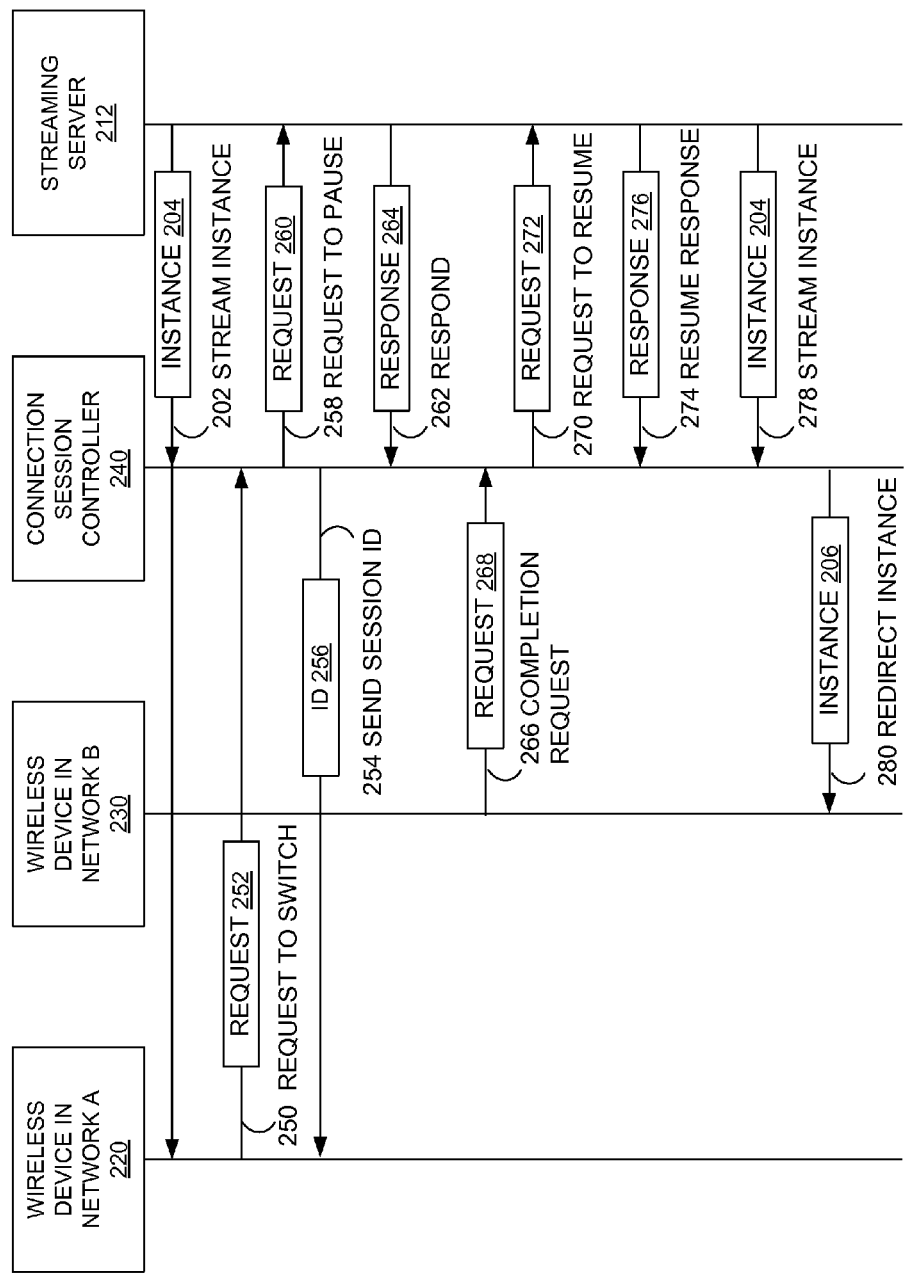
FIG. 2 is a diagram representing the flow of information during a seamless network change for a dual-network device while receiving an instance of streaming media content.

The flow of data in FIG. 2 can be repeated as needed if the dual-network device switches networks more than one time. For example, there could be a situation where WiMAX coverage is not as strong as CDMA coverage, but the device should nonetheless use WiMAX access first. If the device is constantly in and out of WiMAX coverage, then the device may be switching back and forth on a frequent basis. In that case, the method will return from step 280, where the instance is streamed to the second IP address, to step 250 where the switch request is made. Steps 250 through 280 would simply repeat, even with the same session ID 256 described above. The different result will be a third instance, not shown or numbered, once again being substantially similar to the original, but with a third IP address as its redirected destination.

From this described flow of information, a method of seamlessly switching a delivery network for delivering an instance of streaming media content to a dual-network device can be constructed and carried out. A request to switch networks is sent from a mobile device to a connection session controller. Two communications are made by the CSC, in no particular order, in response to the request to switch networks—a session identifier is returned to the mobile device and a request to a pause the stream is communicated to the streaming server. Acknowledgement is sent from the streaming server to the CSC.

Once the mobile device has gained access to the second network, a transition completion request is sent to the CSC. The completion request includes at least the session identifier so that the correct instance of streaming content can be redirected to the mobile device at its new IP address (from the second network's pool of IP addresses). The completion request results in a request by the CSC to resume streaming from the streaming server to the CSC. This request is acknowledged and the instance is streamed to the CSC as before. The controller then redirects the instance of media content to the wireless device at the second IP address.

Figure 3:
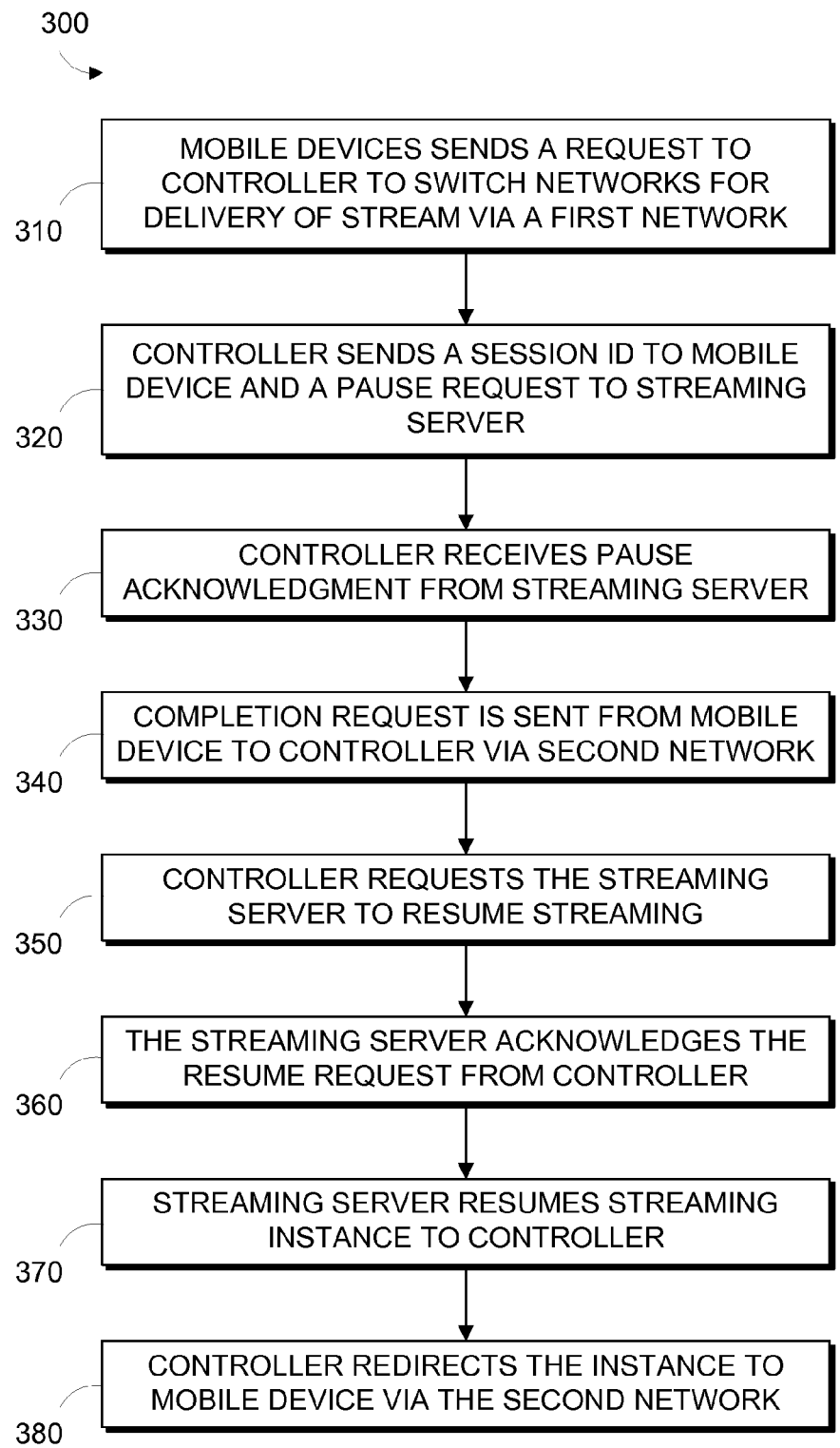
FIG. 3 is a flowchart representing a method of seamlessly switching a delivery network for delivering an instance of streaming media content to a dual-network device.

FIG. 3 shows a flowchart representing a method 300 of seamlessly switching a delivery network for delivering an instance of streaming media content to a dual-network device. At a step 310, a request to switch networks is sent from a mobile device to a connection session controller. The CSC returns a session identifier to the mobile device and sends a request to the streaming server to pause the stream at a step 320. At a step 330, the streaming server sends an acknowledgement to the CSC.

At a step 340, a transition completion request is sent from the mobile device to the CSC. A request made by the CSC to the streaming server to resume streaming is sent at a step 350. At a step 360, the streaming server acknowledges this request and at a step 370 the instance is streamed from the streaming server to the CSC. The controller redirects the instance of media content to the wireless device at the second IP address at a step 380.

The series of requests and responses, when viewed at the mobile device, is more simple, because the communications take place between the device and the controller. While receiving an instance of streaming content from a first access network, for example a CDMA network, a determination is made that the mobile device should switch delivery networks. This can be because of signal strength to access the network, current usage of each network, or one of a number of other factors. The method of this determination is not of particular importance within the context of this disclosure, so long as such a determination is made.

Because of the determination, a request is sent from the mobile device to the connection session controller to initiate a switch in delivery networks. This can be accomplished through a switching helper application residing on the mobile device. The mobile device receives a response from the CSC containing at least a session identifier. This identifies at least the instance of streaming media content that is being communicated to the device and the server from which the content is served. Again, this information can be received by the switching helper application.

The mobile device gains access to a second network of a different protocol, e.g., a WiMAX network. Once communication on the second is possible through authentication of the device, the mobile device sends a completion request to the controller. The completion request can also be facilitated by the SHA, and includes at least the session identifier. By including the session ID, the appropriate instance of media content can be redirected to the device at the second IP address. The mobile device receives the instance of media content, streamed this time via the second access network to the second IP address.

Figure 4:
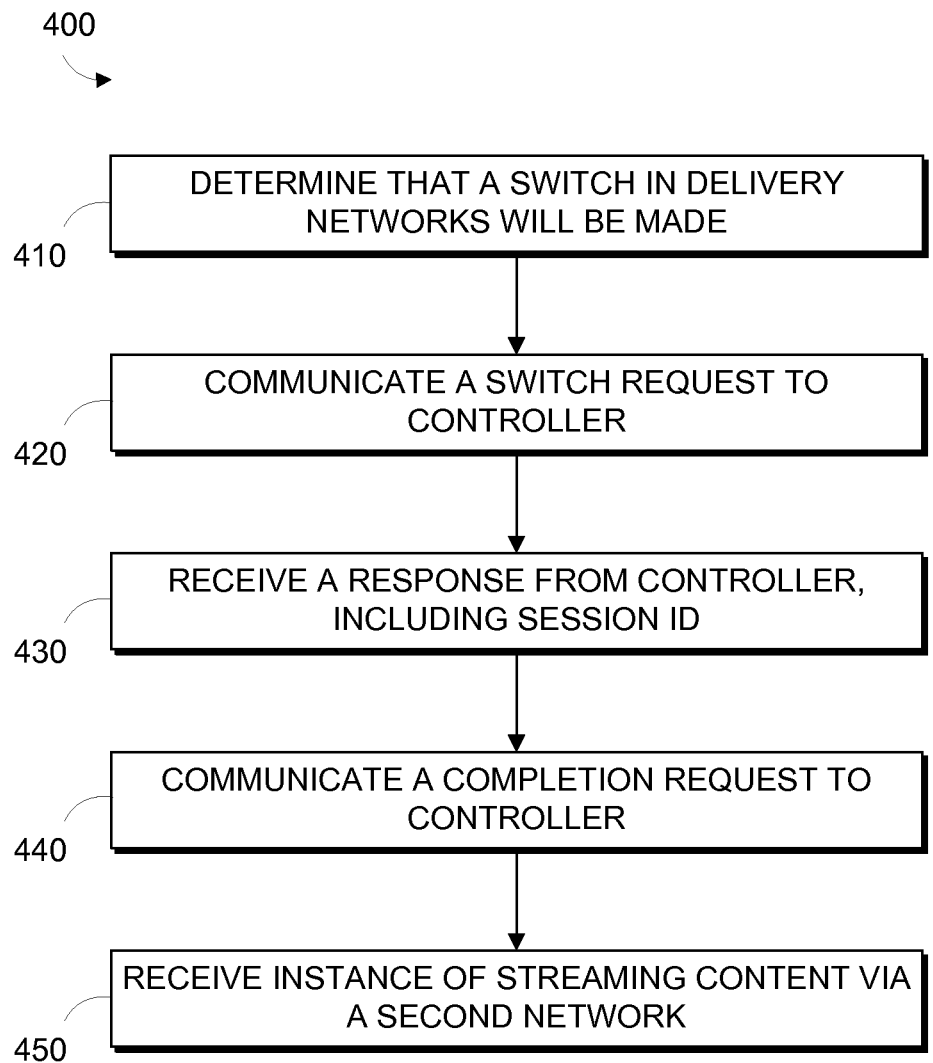
FIG. 4 is a flowchart representing a method for a mobile device to request a seamless transition of delivery networks.

FIG. 4 depicts a flowchart of a method 400 for a mobile device to request a seamless transition of delivery networks. At a step 410, a determination is made that the mobile device should switch delivery networks. A request is sent from the mobile device to the connection session controller to initiate the switch at a step 420. At a step 430, the mobile device receives a response from the CSC. At a step 440, the mobile device sends a completion request to the controller. The mobile device receives the instance of media content via the second access network at a step 450.

As seen at the controller, a method of seamlessly switching delivery networks also is a series of requests and responses. While communicating an instance of streaming media content to a mobile device, the CSC receives a request to switch delivery networks from the device. In response, the CSC sends a session ID to the mobile device and a request to pause the streaming content to the streaming server. The session ID was generated at the initiation of the streaming service so that the server and instance can be identified. Incident to the pause request, a response is received from the streaming server that the pause command has been received and acknowledged.

The CSC receives a completion request from the mobile device. This completion request is sent via the device's access on the second delivery network. Upon identifying the proper instance of streaming media content, the controller sends a request to the streaming server to resume the instance. A response is received at the CSC from the streaming server acknowledging this resumption request and the instance is streamed to the CSC from the server. The CSC streams the instance to the device at the second IP address.

Figure 5:
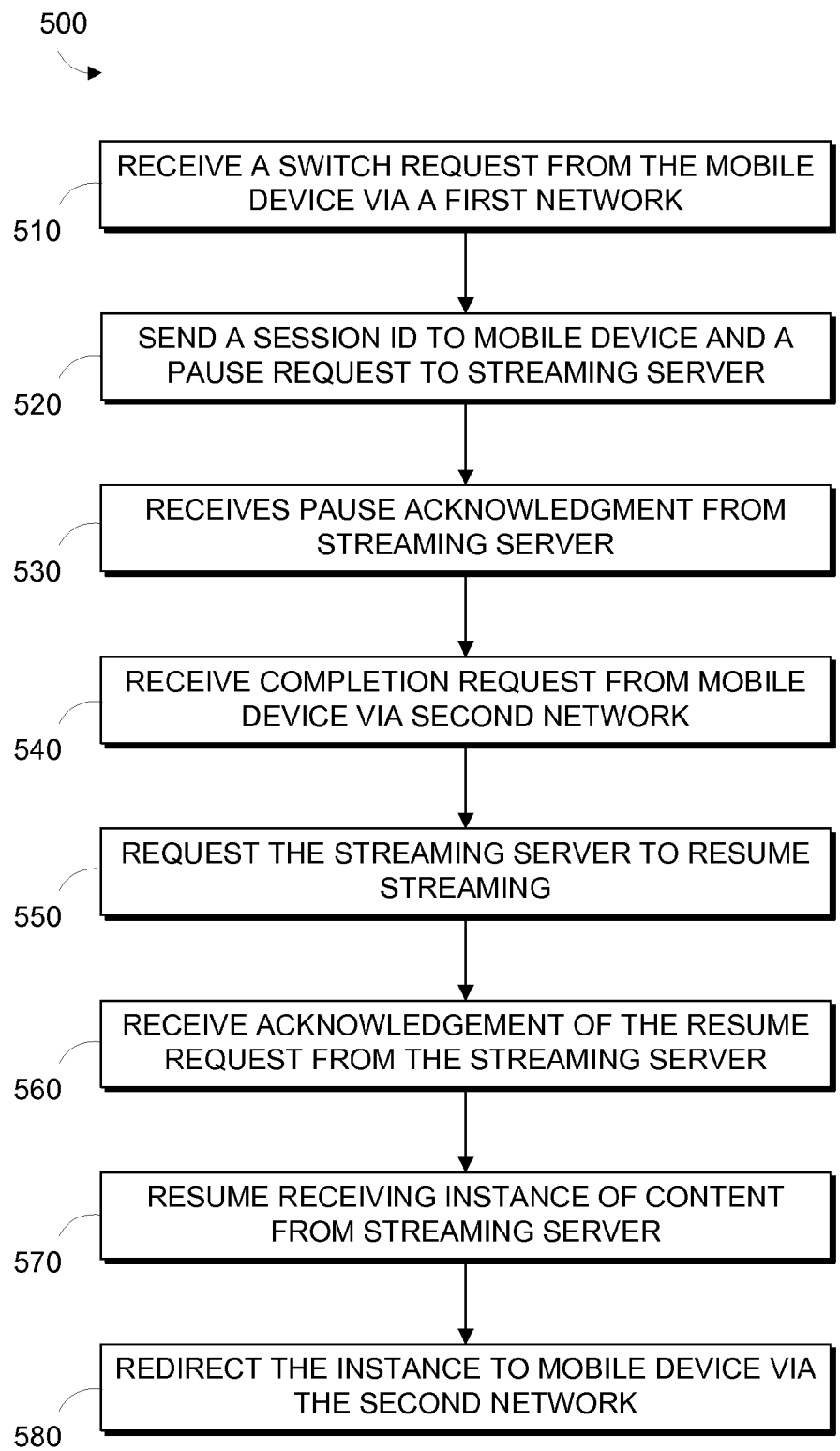
FIG. 5 is a flowchart representing a method of seamlessly switching a delivery network at a connection session controller.

A flowchart representing a method 500 of seamlessly switching a delivery network at a connection session controller is depicted in FIG. 5. At a step 510, the CSC receives a request to switch delivery networks. The CSC sends a session ID to the mobile device and a request to pause the streaming content to the streaming server at a step 520. At a step 530, a response is received from the streaming server acknowledging the pause command. The CSC receives a completion request from the mobile device at a step 540. At a step 550, the controller sends a request to the streaming server to resume the instance of streaming media content. The CSC receives a response acknowledging the resumption request at a step 560 and streaming the instance to the CSC is resumed at a step 570. At a step 580, the CSC streams the instance to the mobile device at the second IP address.

Many different arrangements of the various components depicted, as well as components not shown, are possible without departing from the spirit and scope of the present invention. Embodiments of the present invention have been described with the intent to be illustrative rather than restrictive. Alternative embodiments will become apparent that do not depart from its scope. Alternative means of implementing the aforementioned improvements may be developed without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of seamlessly transitioning between telecommunications networks that provide a streaming service to a mobile device, wherein the mobile device is able to access the streaming service on two telecommunications networks, and wherein the streaming service is initially received at a first address, the method comprising:
   via a first telecommunications network, communicating a switch request from the mobile device to a connection session controller (CSC) to initiate a change in telecommunications networks for the streaming service, wherein the CSC redirects the streaming service from the first telecommunications network to a second telecommunications network, via a connection of access networks on an overall network of a telecommunications provider, wherein the first telecommunications network and the second telecommunications network utilize incompatible protocols, wherein the switch request is generated by a switching helper application configured on the mobile device, wherein each of the first telecommunications network and the second telecommunications network comprise an access services network and a connectivity services network, and wherein the CSC is a proxy server;
   communicating an acknowledgement of the switch request from the CSC to the switching helper application on the mobile device;
   via the second telecommunications network, communicating a completion request from the switching helper application on the mobile device to the CSC;
   incident to communicating the switch request, communicating a pause request from the CSC to a server streaming the streaming service to pause the streaming service;
   receiving an acknowledgement to the pause request from the server to pause the streaming service;
   incident to communicating a second address, communicating a resumption request from the CSC to the server to resume the streaming service;
   receiving the resumed streaming service; and
   forwarding the resumed streaming service to the mobile device at the second address;
   wherein communicating the acknowledgement of the switch request includes communicating a session identifier that identifies at least the streaming service and the server, wherein communicating the completion request includes communicating the session identifier and the second address, and wherein the second address is the address at which the streaming service can be received on the second telecommunications network; and
   receiving the streaming service at the mobile device via the second telecommunications network.

2. The method of claim 1, wherein communicating the switch request includes communicating a service identifier that identifies at least the requested change of telecommunications network.

3. The method of claim 1, wherein receiving the streaming service at the wireless device via the second telecommunications network includes receiving streamed packets that have respective header information changed such that respective header information includes the second address in place of the first address.

4. The method of claim 1, wherein the first telecommunications network is compatible with a first category of networks selected from a wireless microwave access network and a code division multiple access (CDMA) network, and the second telecommunications network is compatible with a second category of networks selected from a wireless microwave access network and a code division multiple access (CDMA) network that is not the same as the first.

5. The method of claim 1, wherein the first address and the second address are Internet Protocol (IP) addresses.

6. One or more non-transitory computer-readable media having computer-usable instructions embodied thereon for performing a method of facilitating seamless transitions for instances of streaming service to dual-network mobile devices by two telecommunications networks providing the instances, wherein the method is performed at a connection session controller (CSC), the method comprising:
   via a first telecommunications network streaming an instance of streaming service to a mobile device at a first address, receiving a first request at the CSC to change streaming service through the first telecommunications network subsequently to be streamed through a second telecommunications network, wherein the first and second telecommunications networks utilize incompatible protocols, wherein the instance of streaming service is received at a first address, and wherein each of the first telecommunications network and the second telecommunications network comprise an access services network and a connectivity services network;
   communicating a first acknowledgement from the CSC to the mobile device acknowledging the first request;
   communicating a second request from the CSC to a server streaming the instance of streaming service to pause the streaming service;
   receiving a second acknowledgement to the second request at the CSC;
   via the second telecommunications network, receiving from the wireless device a third request at the CSC to complete the change of streaming service from the first telecommunications network to the second telecommunications network, wherein the third request includes a second address and a session identifier to denote at least the instance of streaming service and the server;
   communicating a fourth request from the CSC to the server streaming the instance of streaming service to resume the streaming service; and
   redirecting the instance of streaming service to the wireless device via the second telecommunications network,
   wherein the first telecommunications network comprises a provider's network and the second telecommunications network comprises a non-provider network,
   wherein the first acknowledgement includes the session identifier.

7. The media of claim 6, wherein the first request includes a service identifier to denote at least the change from the first telecommunications network to the second telecommunications network.

8. The media of claim 7, wherein redirecting the instance of streaming service includes: receiving from the server one or more packets with respective sets of header information, wherein the sets of header information include the first address of the wireless device; and replacing the first address in the respective sets of header information with the second address.

9. The media of claim 8, wherein the first telecommunications network is compatible with a wireless microwave access network and the second telecommunications network is compatible with a code division multiple access (CDMA) network, or the first telecommunications network is compatible with a code division multiple access (CDMA) network and the second telecommunications network is compatible with a wireless microwave access network.

10. The media of claim 9, wherein each address is an Internet Protocol (IP) address.

11. A system configured for performing a method of enabling a dual-network device to seamlessly transition between two telecommunications networks providing service to the dual-network device, the system comprising:
- a dual-network wireless device configured to receive streaming media from at least two telecommunications networks, via a connectivity services network for integrating the at least two telecommunications networks, wherein the at least two telecommunications networks utilize incompatible protocols in order to provide streaming media to the device wherein each of the at least two telecommunications networks comprise an access services network and a connectivity services network;
- a switching helper application configured on the device to initiate and complete a switch of service from a first telecommunications network to a second telecommunications network during execution of an instance of streaming media; and
- a proxy server configured to receive a switch request from the device and to redirect the streaming media from the first telecommunications network to the second telecommunications network, wherein the switching helper application completes a switch from the first telecommunications network to the second telecommunications network by at least:
  - receiving a session identifier from the proxy server, wherein the session identifier denotes at least the streaming media and a server streaming the streaming media;
  - communicating the session identifier and an address associated with the device in the second telecommunications network back to the proxy server; wherein
  - incident to receiving the switch request, communicating a pause request from the proxy server to a server streaming the streaming service to pause the streaming service;
  - receiving at the proxy server an acknowledgement to the pause request from the server to pause the streaming service;
  - incident to communicating the address associated with the device, communicating a resumption request from the proxy server to the server to resume the streaming service;
  - receiving at the proxy server the resumed streaming service; and
  - forwarding by the proxy server the resumed streaming service to the device at the address; and
  - receiving the instance of streaming media at the address.

12. The system of claim 11, wherein the switching helper application initiates a switch of service from the first telecommunications network to the second telecommunications network by at least requesting a switch and communicating a service identifier associated with the switch of service to the proxy server.

13. The system of claim 12, wherein the address is an Internet Protocol (IP) address.

14. The system of claim 13, wherein the first telecommunications network is a wireless microwave access network and the second network is a code division multiple access (CDMA) network, or vice versa.

* * * * *